METHOD OF MAKING LAMINATED MAGNETIC HEAD

Filed May 19, 1964 3 Sheets-Sheet 1

INVENTOR:
Robert Glass
By Smyth, Roston & Pavitt
Attorneys

INVENTOR:
Robert Glass
By Smyth, Roston & Pavitt
Attorneys

INVENTOR:
Robert Glass

By Smyth, Roston & Pavitt
Attorneys

United States Patent Office 3,417,465

Patented Dec. 24, 1968

3,417,465

METHOD OF MAKING LAMINATED MAGNETIC HEAD

Robert Glass, Woodland Hills, Calif., assignor to Minnesota Mining and Manufacturing Company, St. Paul, Minn., a corporation of Delaware Filed May 19, 1964, Ser. No. 368,718
18 Claims. (Cl. 29—603)

ABSTRACT OF THE DISCLOSURE

This invention relates to a method of forming a magnetic circuit to enhance the operating characteristics of the magnetic circuit. When the magnetic circuit is formed from a plurality of magnetic laminations, each lamination is initially provided with a pair of sections joined by an integrating portion. The laminations are stacked and are then divided at the opposite ends of the integrating portions to form the two sections. To facilitate this operation, the integrating portions may be provided with reference surfaces so that the aligning operations may be optimized. After the sections have been formed, they are joined to produce the magnetic circuit. Before joining the sections, pole faces may be formed on the ends of the sections adjacent the ends of the integrating portions and the sections may be joined to form an air gap between the pole faces.

The invention also relates to a magnetic head produced by the method described above.

The present invention relates to magnetic tape recording and playback heads and, more particularly, to the methods of manufacturing such magnetic heads.

A magnetic tape head is capable of recording and reproducing electrical signals by means of a permanently magnetized magnetic film on a tape. Such a head is positioned adjacent the tape and includes a magnetic circuit having an air gap positioned next to the magnetic film as it travels therepast. The magnetic circuit is formed by a magnetically permeable core and a coil that is wound therearound to encircle at least a portion of the magnetic circuit.

When the head is operating in a recording mode, the tape travels past the air gap and a current corresponding to the signal is circulated through the coil. The current flowing in the coil is effective to produce flux in the magnetic circuit whereby a portion of the flux will emerge from the air gap and pass into or through the magnetic film on the tape. This results in permanently magnetizing various portions of the tape corresponding to the signal.

When the head is operating in the reproducing or playback mode, the flux from the permanently magnetized regions of the tape will pass through the air gap and into the magnetic circuit as the tape moves past the air gap. The resultant fluctuations in the flux density in the magnetic circuit will induce currents in the coil that correspond to the signal recorded on the tape.

In order to reduce the amount of core losses resulting from such effects as eddy currents, etc., it is desirable for the magnetic circuit to be formed by a plurality of magnetic laminations. This is particularly where the signals cover a wide band of frequencies that extend up into the region of several megacycles per second. To form a magnetic core for a head, layers of lamination are built up to the desired thickness and bonded together.

In some types of magnetic tape heads and particularly those capable of operating at high frequency, it is desirable to employ a small air gap, for example, in a range on the order of 0.000040 inch. At the present time, it is impossible or extremely difficult to cut such a short air gap into a fully assembled magnetic circuit. Accordingly, heretofore, it has been customary for each layer of laminations to consist of at least two separate members. The members in each layer are joined together to extend completely around the magnetic circuit. A pair of members in each layer have their mating ends spaced to form an air gap having the required dimensions.

A magnetic tape recording-playback head produced in the foregoing manner performs satisfactorily for most applications and can even be made to operate with a reasonable degree of fidelity at moderately high frequencies. However, as the frequencies of the signals increase beyond some "cut-off" level, the characteristics of the head begin to deteriorate and thereby limit the frequency range of the head. One factor that contributes to this deterioration of response characteristics is misalignment of the ends of the lamination member on the opposite sides of the air gap. When the registering ends of the lamination members on the opposite sides of the air gap are misaligned, the flux field does not remain uniform. This, in turn, leads to distortions of the flux field and nonlinearities. The effects of such misalignment become progressively more acute as the frequency of the signal increases.

Another factor that reduces the "cut-off" frequency is the volume of magnetic material in the core. To raise the "cut-off" frequency, it is customary to reduce the size of the core, and, as the thickness of the laminations are decreased, the effects of misalignment of the exposed ends of the laminations become more pronounced. In a typical high frequency head capable of operating in the megacycle range, the laminations may be on the order of about 0.004 inch thick with a layer of bonding material therebetween on the order of about 0.0003 inch thick. It will thus be seen that if it is desired to align the laminations with each other, it is necessary for the laminations to be extremely precisely positioned.

It has been found as a practical matter that in ordinary production-type operations, it is impossible to position the laminations in alignment with each other for several reasons. For example, the dimensions of the mating ends of the laminations and particularly the thicknesses thereof vary over a considerable range. It is readily apparent that if the laminations on one side of the air gap are relatively thin while the laminations on the opposite side of the air gap are relatively thick, a considerable amount of mismatching of the laminations will occur. Also, the thickness of the bonding material between the laminations is dependent upon several variable factors such as the pressure applied during the lamination process, the internal friction of the structure, etc.

It will thus be seen that the spacing between the laminations can vary over a considerable range in different heads and even within the same head. As a consequence, heretofore, it has been impossible to precisely align all of the laminations in a magnetic recording head and, particularly, on a production line basis.

The characteristics of a magnetic recording-playback head are dependent upon the magnetic characteristics of the magnetic circuit formed by the core. As a consequence, the various magnetic characteristics of the laminations are critical. Due to the small size of the laminations, even relatively small discontinuities or impurities in a lamination will have a major effect on the magnetic characteristics of the entire lamination. Also, the nature of the heat treatment of the lamination, internal stress and strain, work hardening, etc. can all produce very large variations in the magnetic characteristics of a lamination member. Since the size of the core is relatively small and there are a small number of lamination layers, the characteristics of the entire core may be affected.

As pointed out above, the small size of the air gap makes it desirable for each layer of lamination to be formed from two separate members. Prior to assembly, the individual lamination members are in the form of an open magnetic circuit having an extremely large air gap. As a consequence, the magnetic characteristics of the member are determined primarily by the characteristics of the air gap and only minutely by the magnetic characteristics of the materials in the member. Although numerous attempts have been made in the past to provide means for checking the magnetic characteristics of the lamination members due to the inherent dimensions and shapes of the lamination members, it has been extremely difficult if not impossible to determine the magnetic characteristics of the individual members within any useful degree of accuracy. As a consequence, heretofore, it has been necessary to assemble or laminate the members into an entire core before the magnetic characteristics can be measured. Since it is most economical to wind the coils onto the laminations before they are assembled into a core, the magnetic head is virtually completed before the magnetic characteristics of the core can be checked. Unfortunately, a considerable investment in time and materials has been made prior to this time and in the event of a defect a substantial loss is incurred.

The present invention provides means for overcoming the foregoing difficulties. More particularly, the present invention provides a magnetic tape recording-playback head having very linear characteristics over extended operating ranges and a method of assembling such a head. This is accomplished by, among other things, employing a magnetic core that is constructed by bonding layers of magnetic laminations together to form an air gap wherein the exposed ends of the layers of laminations on the opposite sides of the air gap are very precisely aligned with each other.

The present invention also provides a magnetic tape recording-playback head and the method of assembling the same that is cheaper, more reliable and more uniform in operation than in the prior art. This is accomplished by, among other things, assembling a magnetic core from lamination members that are constructed and arranged so that their magnetic characteristics may be easily and accurately determined prior to the time that the lamination members are assembled into a virtually complete head.

In one form of the present invention, a plurality of magnetic members are provided which have two separate sections that correspond to portions of the magnetic circuit to be formed. The adjacent ends of the two sections are joined together by a common junction. Each of the magnetic members includes a reference surface suitable for use with a jig or fixture whereby a group of the members may be rapidly stacked and positioned in exact alignment with each other. When the magnetic members are stacked on the jig or fixture, all the junctions and the adjacent ends will be precisely aligned. After the laminates have all been properly aligned with each other, they are bonded together to provide a core structure. After the laminates have all been bonded together into a single core structure, the structure is divided along the junction into two core segments. The two core segments are then repositioned and interconnected with each other to form a core that includes the magnetic circuit. The two ends of the core segments originally adjacent the junction and formed by the dividing operation provide the pole faces on the opposite sides of an air gap. Since the registering ends of the laminates on the opposite sides of the air gap are from the same original piece, even though the thicknesses of the lamination members may vary, the registering ends on the opposite sides of the air gap will have exactly the same thickness. Also, since the lamination members were bonded together at the same time, the spacing between the registering ends of the lamination members will be uniform on both sides of the air gap. As a result, all of the exposed ends on the opposite sides of the air gap will be very precisely aligned.

In one form of the invention, a magnetic core is constructed from a plurality of relatively thin magnetic lamination members. The members are formed in groups from a sheet of magnetic material having a thickness substantially equal to the thickness of the laminations. All of the members in the group are all interconnected with each other and form a closed magnetic loop. Prior to the time the lamination members are divided from the group, inductive means such as a primary winding and a secondary winding are provided around one or more portions of the members in the group so as to be coupled to the magnetic loop. A suitable test current may then be circulated through at least one of the windings. Since the members are in the form of a closed magnetic circuit, the magnetic characteristics of the members may be accurately determined. If the magnetic members are of acceptable quality, the group may be divided to provide separate members. These members may then be assembled into a core suitable for use in a magnetic head. However, if a member does not have the required characteristics, it may be discarded without investing any further time and materials. This will be effective to not only reduce the cost of producing magnetic tape heads, but also to increase the reliability of the heads and to improve the characteristics by eliminating the use of defective materials.

These and other features and advantages of the present invention will become readily apparent from the following detailed description of a limited number of embodiments thereof, particularly when taken in connection with the accompanying drawings wherein like reference numerals refer to like parts and wherein.

Figure 1:
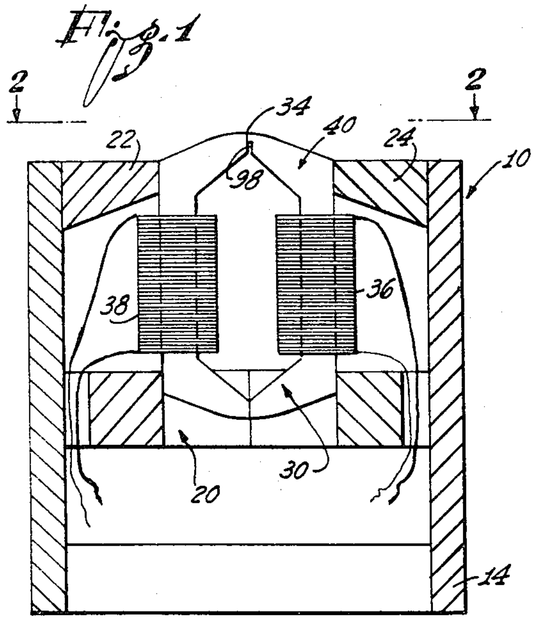
FIGURE 1 is a transverse cross-sectional view of a laminated magnetic tape recording-playback head embodying one form of the present invention.
Figure 2:
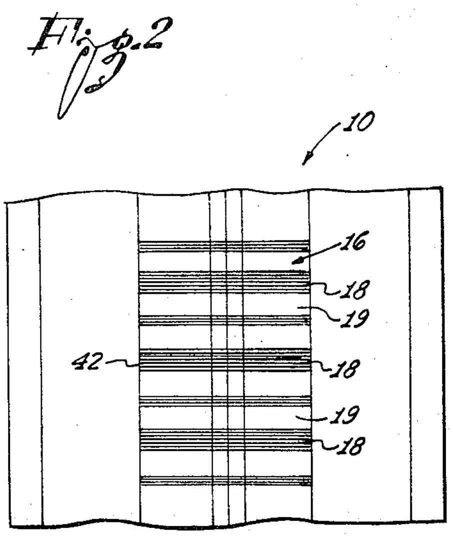
FIGURE 2 is a fragmentary end view of a portion of the recording-playback head of FIGURE 1.
Figure 3:
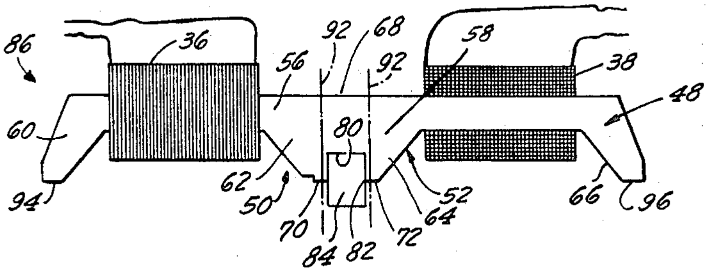
FIGURE 3 is a view of a partially fabricated core structure employed at one step in the production of the head of FIGURES 1 and 2.
Figure 4:
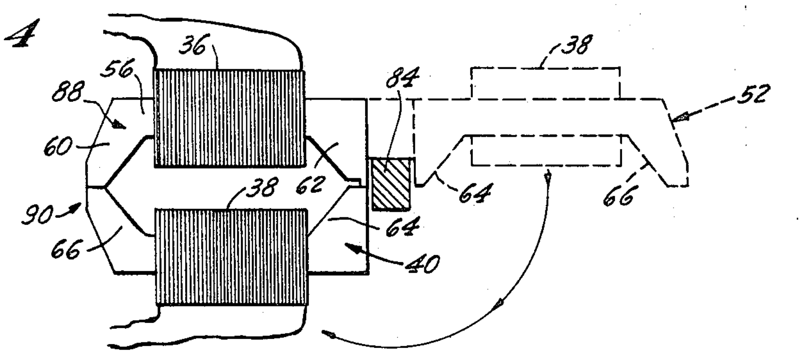
FIGURE 4 is a view similar to FIGURE 3, but showing the core structure as it is employed at another step in the production of the head of FIGURES 1 and 2.
Figure 5A:
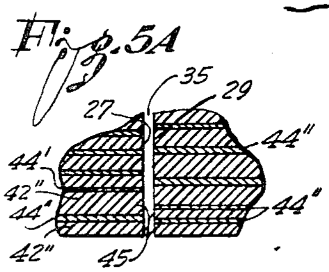
Figure 5B:
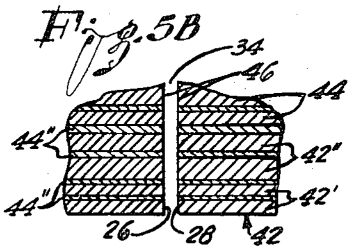
Figure 6:
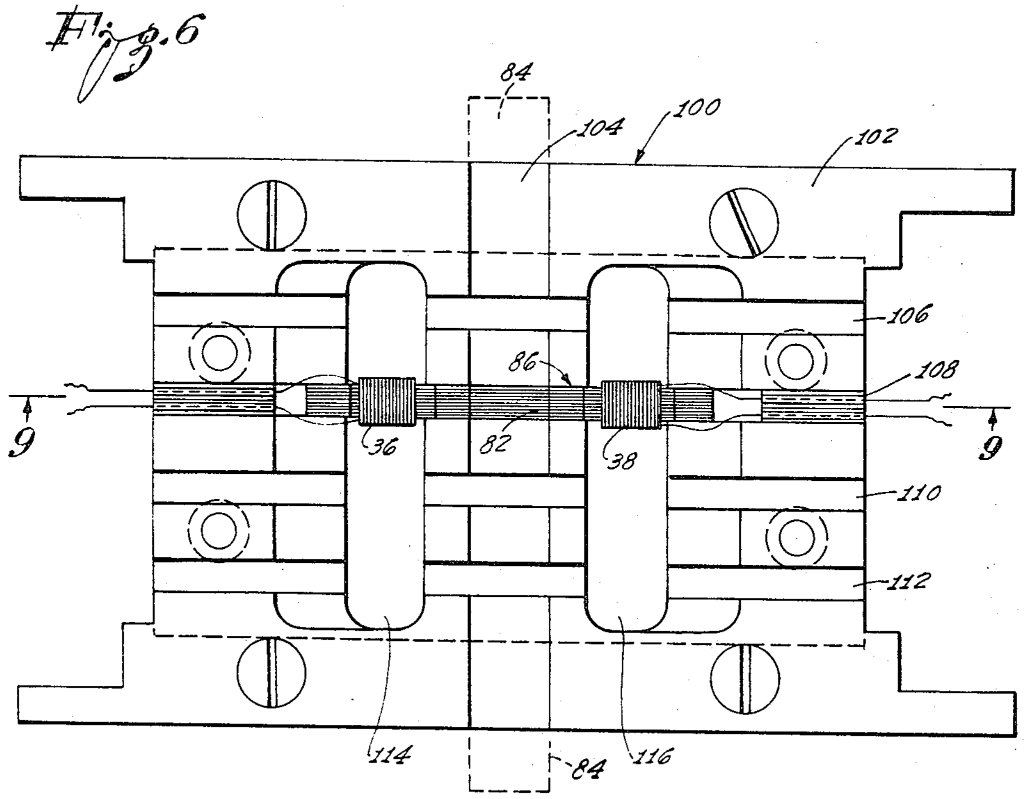
Figure 7:
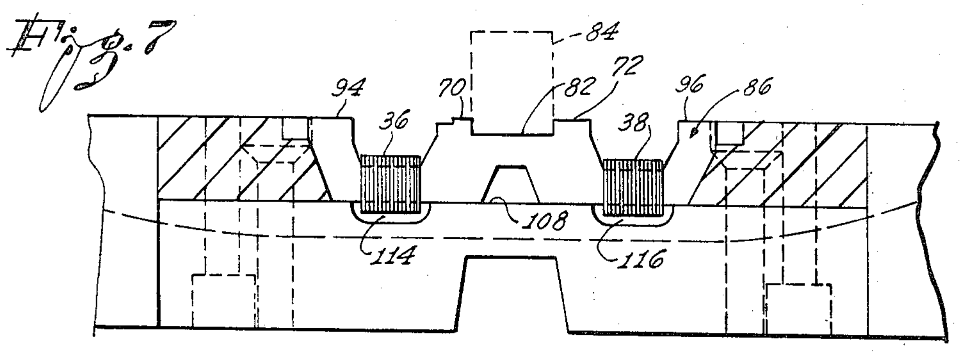
Figure 8:
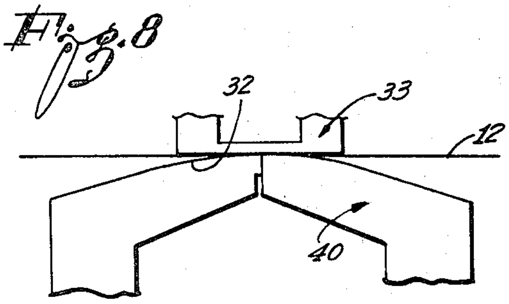
Figure 9:
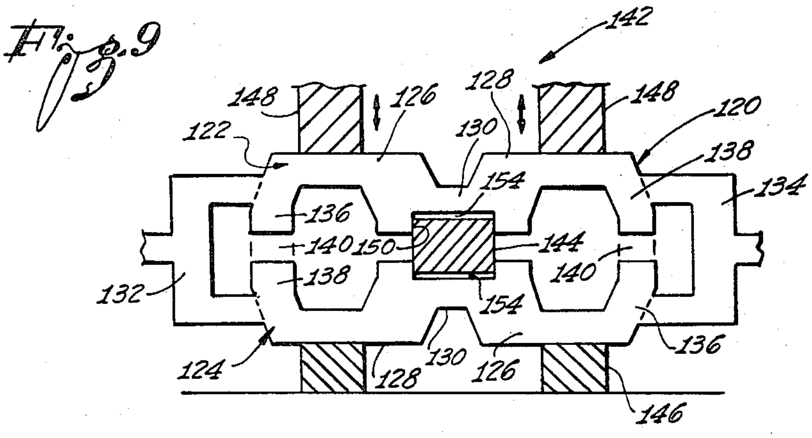
Figure 10:
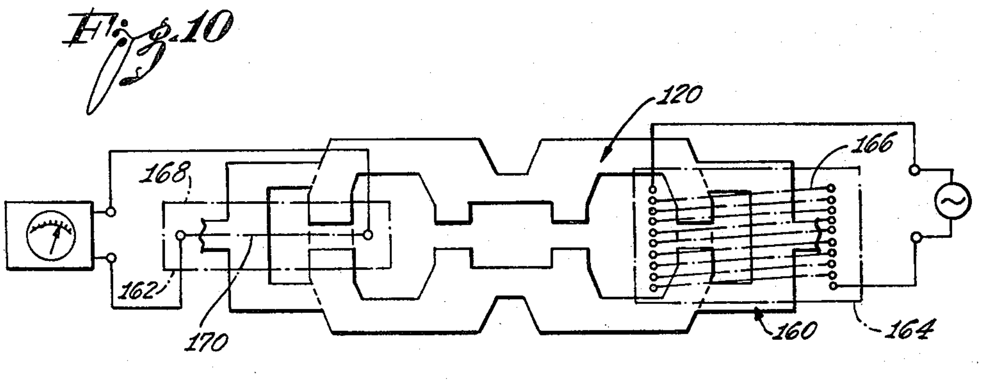

FIGURE 5*a* is a fragmentary end view similar to FIGURE 2, but on a very greatly increased scale, of a prior art recording-playback head;

FIGURE 5*b* is a fragmentary end view, similar to FIGURE 5*a*, but of a recording-playback head embodying the present invention and assembled by the steps shown in FIGURES 3 and 4;

FIGURE 6 is a view of a partially fabricated recording-playback head employed at one step in the production of the recording head of FIGURES 1 and 2;

FIGURE 7 is an end view of the partially fabricated head of FIGURE 6;

FIGURE 8 is an end view of the head of FIGURES 1 and 2 for use in scanning a magnetic tape;

FIGURE 9 is a view of an apparatus for inspecting and assembling groups of laminations for use in one step of fabricating the head of FIGURES 1 and 2; and FIGURE 10 is a view similar to FIGURE 9 of an apparatus for checking the magnetic characteristics of partially fabricated laminations for use in one step of fabricating the head of FIGURES 1 and 2.

Referring to the drawings in more detail, the present invention is particularly adapted to be embodied in a magnetic tape head 10 for recording signals on a tape 12 by permanently magnetizing a magnetic film on the tape 12 and/or for reproducing signals by scanning the permanent magnetization in a magnetic film on the tape 12. The invention is also adapted to be embodied in a method of manufacturing magnetic tape heads 10.

A magnetic tape head 10 embodying one form of the present invention is shown in FIGURES 1 and 2. The head 10 includes an outer protective housing 14 that encloses the various portions of the head 10 and protects them from their environment. The housing 14 is adapted to be mounted on a suitable structure such as a tape transport. One end of the head 10 includes a nose or smooth, slightly rounded surface 16. This surface 16 is adapted to be maintained in sliding contact with the tape 12 so as to scan the tape 12 as it is driven through the tape transport.

Although the head 10 may scan only a single track on the tape 12 in the present instance, it is particularly adapted to scan a large number of tracks laterally spaced across the tape. Accordingly, the surface 16 includes a plurality of spaced portions 18, each of which is effective to scan a single track on the tape 12. The portions 18 may be positioned immediately adjacent to each other or they may be spaced apart as best seen in FIGURE 2. This will provide an open or guard space 19 between each portion 18. A second head, similar to and longitudinally displaced from the present head 10, may include portions, similar to portions 18, positioned to scan tracks that are interleaved with the first set of tracks scanned by portions 18.

The various portions 18 are all mounted in a support 20 that is included inside of the housing 14. Although the support 20 may be a single member, it has been found desirable to employ a pair of separate members 22 and 24 which are substantially identical to each other. The two members 22 and 24 normally consist of a non-magnetic material such as brass.

The members 22 and 24 respectively include substantially planar faces 26 and 28 that mate with similar faces on the other member when the two members 22 and 24 are secured together. A separate channel is provided in each face 26 and 28 for each of the separate portions 18. The channels in the two faces 26 and 28 are aligned with each other. As a result, when the two members 22 and 24 are secured together, the pairs of registering channels will form passages through the support 20.

Each portion 18 for scanning the tracks includes a magnetic circuit 30 mounted in a channel and retained in a fixed position therein.

Each of the magnetic circuits 30 includes an exposed end which is positioned in the surface 16. Preferably each exposed end includes a rounded surface 32 that is positioned flush with the nose or rounded surface 16 on the end of the support 20. The combination of the rounded surfaces 16 and 32 form a very smooth overall surface over which a magnetic tape 12 may be transferred without damaging the tape. When a tape travels over the smooth rounded surfaces 16 and 32, each track in the tape 12 will be aligned with a respective magnetic circuit 30. A pressure plate 33 may be provided to maintain an intimate relation between the tape and the magnetic circuits 30.

All of the magnetic circuits 30 are substantially identical to each other and include an air gap 34 in the exposed end. This will be effective to maintain the air gap 34 disposed immediately adjacent to the magnetic film on the tape 12. If there is any flux circulating in the magnetic circuit 30, a substantial amount of the flux will extend from the air gap 34 and penetrate into the magnetic film on the tape 12. This will be effective to produce a permanent magnetization of the film corresponding to the flux in the circuit 30. If the portion of the film adjacent the air gap 34 is magnetized, the resultant flux will extend into and circulate around the magnetic circuit 30. This will be effective to produce a flux density in the magnetic circuit 30 similar to the permanent magnetization in the tape 12.

One or more coils 36 and 38 are provided on the magnetic circuit so as to encompass at least a portion of the circuit 30. It may be seen that if a current flows through the coils 36 and 38, it will produce a corresponding flux density in the magnetic circuit 30. As a consequence, if the head 10 is operating in a record mode, the magnetic film on the tape will be permanently magnetized according to the current in the coils 36 and 38.

It may also be seen that any flux coupled into the magnetic circuit 30 from the tape 12 will induce a corresponding current into the coils 36 and 38. As a consequence, if the head 10 is operating in a playback mode, the coils 36 and 38 will have a current that corresponds to magnetization in the tape 12.

Each of the magnetic circuits 30 includes a magnetically permeable core 40. The core 40 forms a closed loop except for the air gap 34. In order to increase the linearity of the characteristics of the head 10 and to reduce any losses from eddy currents, etc., it is desirable for the core 40 to include a large number of electrically isolated lamination layers 42. Each of the layers 42 is preferably sufficiently thin to virtually eliminate excessive eddy currents within any lamination layer 42. By way of example, the layers 42 may be on the order of 0.004 inch thick. Insofar as it is possible to do so, it has been found desirable to maintain the thicknesses of the layers 42 within a range of plus or minus 0.0002 inch of the normal thickness of 0.004 inch.

The individual lamination layers 42 are all secured together by suitable fastening means capable of providing an integral structure. The layers 42 should be electrically insulated from each other to prevent electrical currents flowing from one layer into an adjacent layer.

One means of securing the lamination layers 42 together into a single integral structure and electrically isolating the layers is to employ a suitable bonding material such as an epoxy resin. Such a material will provide electrically non-conductive layers 44 between the laminations. The thicknesses of the layers 44 will vary due to the character of the bonding material, the amount of pressure forcing the laminations together, the amount of internal friction present, etc. As a consequence, some of the layers, such as layers 44′ will be thin and some layers such as 44″ will be thick. Normally, the layers 44 of bonding material may be maintained within a range between .0005 and .0007 inch.

It may be seen that some variations may also occur in the thicknesses of the lamination layers 42. For example, some layers such as layers 42′ may be relatively thin while other layers such as layers 42″ may be relatively thick. As may be seen from the prior art gap in FIGURE *5a*, a series of thin lamination layers 42′ and bonding layers 44′ on one side of the air gap 35 may be aligned with a series of thick lamination layers 42″ and bonding layers 44″. When this condition exists, the exposed ends 45 of the various lamination layers 42 in one pole face 27 or 29 will not be precisely aligned with the exposed ends 45 of the layers 42 in the opposite pole face 29 or 27 respectively. It has been found that when the exposed ends 45 of the lamination layers 42 are misaligned in the manner shown in the prior art air gap 35 of FIGURE *5a*, the flux field in the air gap 35 and in the laminations immediately adjacent the air gap 35 are distorted. This has been effective to reduce the fidelity of the recording and playback and to reduce the upper "cut-off" frequency.

In the present embodiment, the exposed ends 46 of the laminations 42 on both sides of the air gap 34 are precisely aligned with each other as a result of employing the steps illustrated in FIGURES 3 and 4. Normally, the first step is to prepare a plurality of lamination members 48 for use in forming the lamination layers 42. The members 48 may be formed from a solid sheet of a suitable magnetically permeable material. The sheet may have a uniform thickness that is equal to the desired thickness of the laminations. Normally, the thicknesses of the sheets and lamination members 48 are on the order of 0.004 inch. Due to production tolerances, this thickness may vary over a considerable range. However, it is usually possible to maintain the thickness of the lamination members 48 within about ±0.0002 inch of the nominal thickness of 0.004 inch.

The lamination members 48 may be formed from the sheet by any suitable means. However, it has been found that a precision etching process is particularly well suited for this purpose. In such a process, a portion of the sheet is masked according to the desired shape of the lamination member 48. The sheet is then immersed into a suitable etch whereby the sheet will be dissolved except for the masked area. This, in turn, will leave only the lamination member 48.

In a normal tape recording head 10, the air gap 34 is on the order of about 0.000040 inch across. It may be appreciated that it is extremely difficult, if not impossible, to cut an air gap of this dimension through a core. As a result, the most convenient way to form the core 40 and air gap 34 is to form each of the lamination layers 42 from a plurality of separate members. The separate members are shaped to correspond to the various portions of a lamination layer 42 and are joined end-to-end to complete a layer. One pair of adjacent ends are very precisely separated by the length of the air gap 34.

Accordingly, the members 48 include two separate sections 50 and 52 that correspond to two different portions of the magnetic circuit 30. When the two sections are secured end-to-end, they will form a single lamination layer 42.

In the present instance, the two sections 50 and 52 are substantially identical to each other and include sides 56 and 58 and arms 60–62 and 64–66. The two sections 50 and 52 are joined together by means of a junction 68. This junction 68 may be disposed near the middle of the lamination member 48 and interconnects the two arms 62 and 64. As a result, the two arms 62 and 64 and particularly the ends 70 and 72 thereof are formed from immediately adjacent or contiguous portions of the lamination member 48. There may be considerable variation between the thicknesses of the various lamination members 48. However, the thickness of any given member 48 will be substantially uniform over its entire length and will be virtually free of any variation in a distance on the order of the space between the ends 70 and 72 of the arms 62 and 64. As a consequence, the thicknesses of the arms 62 and 64 and particularly the ends 70 and 72 will be identical.

Each of the junctions 68 may include a reference surface 80. The reference surface 80 on each member 48 has a predetermined relationship to the various portions of the member 48 such as the sides 56–58, arms 60–62–64–66, ends 70–72, etc. This reference surface 80 may be of any desired variety. By way of example, it may be formed by a notch or rectangular recess 82 which extends inwardly into the junction 68 from one edge of the member 48. As will become apparent subsequently, the surfaces 80 of recess 82 are particularly adapted to receive a suitable jig or fixture 84 and thereby accurately position the lamination members 48.

After the various lamination members 48 have been prepared, they may be assembled into an integral core structure 86. This may be accomplished by positioning a group of lamination members 48 so that the recesses 82 fit over a suitable jig or fixture such as a rectangular bar 84. The reference surface 80 on the recesses 82 will all be inintimate contact with the exterior of the bar 84. It will be seen that since the reference surfaces 80 have predetermined relationships to the remainders of the lamination members 48, all of the lamination members 48 will be precisely aligned with each other and particularly the ends 70 and 72 thereof.

While the lamination members 48 are positioned on the bar 84 and are all precisely aligned, they may be permanently secured together by any suitable means. By way of example, this may be accomplished by employing a suitable bonding material such as an epoxy resin or laminating sheets. The bonding material is disposed between the lamination members 48. Suitable amounts of heat and/or pressure may be applied to the group of lamination members 48 until they are all bonded together into a single integral rigid structure 86.

After the bonding operation is completed, a single rigid core structure 86 will be provided. The successive lamination members 48 in the structure will be separated from each other by electrically non-conductive layers 44. The thicknesses of these layers 44 will be dependent upon a large number of factors such as the nature of the bonding material, the amount of pressure applied, etc. As a result, the thicknesses of the layers 44 may vary over a considerable range between successive structures 84 and also within a single structure. This, in turn, will result in substantial variations between the spacings of the successive lamination members 48.

However, the thickness of any one layer 44 will remain essentially uniform over its entire length and if any variations do occur they will be very gradual. As a consequence, the thickness of a layer 44 will be virtually constant over the short distance between the ends 70 and 72 on each side of the junctions 68.

After the lamination members 48 have been bonded into an integral core structure 86, the various coils 36 and 38 may be provided upon the sections 50 and 52. Normally, this is accomplished by winding the two coils 36 and 38 upon the sides 56 and 58 while the core structure 86 is still a single rigid structure, since the structure 86 includes the aligned reference surface 80 or recesses 82 that provide a very convenient means for mounting the structure while the coils 36 and 38 are being wound.

After the integral core structure 86 has been provided, it may be divided into two separate segments 88 and 90. The division may be made in the region of the aligned junctions 68 whereby the segments 88 and 90 will be substantially identical and correspond to the two halves of the fully assembled core 40.

The division of the core structure 86 may be accomplished by any suitable means such as cutting, etching, etc., to remove the junctions 68. In the process of dividing the structure 86 in two, normally the entire region between the two lines 92 in FIGURE 3 is removed.

After the division of the core structure 86, the resultant two separate core segments 88 and 90 will be substantially identical to each other. Each segment 88 and 90 includes a side and a pair of arms that correspond to the sides 56 and 58 and the arms 60–62 and 64–66. Each segment 88 and 90 has a coil 36 or 38 wound around the sides 56 and 58. It should be noted that if so desired the coils 36 and 38 may be wound on the segments 88 and 90 after the core structure 86 is divided in two.

After the segments 88 and 90 are formed, they may be repositioned and joined together in the manner illustrated in FIGURE 4. The ends 70 and 72 of the two arms 62 and 64 are adapted to register with each other while the ends 94 and 96 of the arms 60 and 66 are adapted to register with each other. As will become apparent subsequently, the two ends 94 and 96 are adapted to fit together as closely as possible and produce a minimum discontinuity in the magnetic circuit. However, the ends 70 and 72 of the arms 62 and 64 form pole faces that are adapted to be separated from each other by the air gap 34. This air gap 34 provides the only major discontinuity in the magnetic circuit. It has been found desirable under some circumstances to relieve a small recess 98 in one end to decrease the size of the air gap 34 and concentrate the flux adjacent the outer edge thereof.

Normally, the length of the air gap is on the order of 0.000040 inch. To provide an air gap of such a dimension and to insure a uniform length, the two pole faces may be lapped to insure their being flat and parallel.

The two segments 88 and 90 are bonded together with a suitable bonding agent such as a resin. After the bonding operation, the two ends 94 and 96 are in intimate contact with each other. However, the pole faces or ends 70 and 72 are separated by a thin film of resin. The thickness of the film corresponds to the length of the air gap 34.

Each of the pole faces 26 and 28 includes the ends 46 of the lamination layers 42 and the layers 44 of bonding materials therebetween. As pointed out above, the registering ends of the layers 42 and 44 initially were disposed immediately adjacent to the junction. As a consequence, the ends 46 in a registering pair were portions of the same member 42 and will have identical thicknesses. Also, the registering layers 44 on the opposite sides of the air gap 34 were originally disposed immediately adjacent each other and will be of identical thickness. This will insure the exposed ends 46 on the opposite sides of the air gap 34 being identically spaced and perfectly aligned with each other.

The head and the magnetic cores may be assembled in any desired manner. However, it has been found advantageous to assemble the head 10 and core 40 in a manner similar to that illustrated in FIGURES 6 and 7. This will not only greatly simplify the assembly, but will also insure a very precise alignment of the two halves of the magnetic core.

The two support members 22 and 24 are formed from a common blank 100 that comprises a single integral member. One side of the blank 100 includes a surface 102 which is substantially planar. A plurality of separate channels are provided in the plane surface 102. The first channel 104 provides a plurality of reference surfaces. The reference channel 104 is recessed into the plain surface adjacent the center thereof and extends transversely of the blank 102. Preferably, the reference surfaces have substantially the same shape as the surfaces formed by the recesses in the lamination members. As a consequence, the reference channel 104 is adapted to receive the jig or fixture 84 employed to align the lamination members.

In addition, a separate channel may be provided in the surface 102 for each track that is to be recorded on or reproduced from the tape. In the present embodiment, four channels 106, 108, 110 and 112 are provided. The channels 106, 108, 110 and 112 extend longitudinally of the blank 100 substantially normal to the reference channel 104. The channels 106, 108, 110 and 112 are separated by distances that correspond to the spacing between the successive tracks.

Each of the channels 106, 108, 110 and 112 has a width that is substantially equal to the thickness of an integral laminated core structure 86. The depth of the channels 106, 108, 110 and 112 are approximately equal to the heights of the core structures 86. When a core structure 86 is seated in a channel, the ends 70, 72, 94 and 96 will be substantially flush with the plane surface 102 on the blank.

Clearance pockets 114 and 116 may extend across the blank 100 in the regions where the sides 56 and 58 will be positioned. These pockets 114 and 116 extend transversely across the blank 100 parallel to the reference channel and are of sufficient size to accommodate the coils.

Preferably, each channel or at least the final surfaces thereof are formed by a continuous operation such as by grinding, milling, etc. The continuous operation may progress the entire length of the blank and thereby eliminate any discontinuities in the channels or the surfaces thereof. As a result, each of the channels 106, 108, 110 and 112 will be virtually straight over their entire length. In the event there are any variations in a channel, they will be of a minor nature and will be of extremely small magnitudes over short increments of the channel.

After the channels 106, 108, 110 and 112 and pockets 114 and 116 have been provided in the blank, a laminated core structure 86 may be positioned in each of the channels 106, 108, 110 and 112. A suitable jig or fixture such as the bar 84 may be positioned in the transverse reference channel 104 and in the notches 82 in the junctions 68 of the core structures 86. The reference surfaces on the channel and notches will be effective to permit a very quick and precise alignment of all of the laminated structures 86 on the blank 100. More particularly, all of the ends 70, 72, 94 and 96 will be accurately aligned respectively with each other. After the laminated structures 86 are all properly positioned, they may be secured in position by any suitable means such as an epoxy resin being poured into the pockets 114 and 116 in the regions of the coils 36 and 38.

After the laminated core structures 86 have been bonded into position on the blank 100, the blank 100 and the laminated structures 86 may be divided into two separate portions by any suitable operation. The dividing operation will normally remove the portions of the core structures 86 in the regions of the junctions 68. Also, the portions of the blank 100 in the region of the reference channel 104 will also be removed.

After the blank 100 and core structures 86 have been divided in two, each half will include a support member 22 or 24 and a segment 88 or 90 of the magnetic circuit 30. The segments 88 and 90 on each support member 22 or 24 will have the ends 70, 72, 94 and 96 thereof disposed substantially coplanar with the faces 26 and 28 of the support members 22 and 24. The two support members 22 and 24 may now be repositioned so that the faces 26 and 28 thereon will be in intimate contact with each other. Following this, the support members 22 and 24 are secured together by any suitable means such as bolts and/or a bonding material.

It will be noted that since each of the channels 106, 108, 110 and 112 was formed by a single operation, the portions of the channels immediately adjacent to the removed material and to the ends 70 and 72 will be very precisely aligned with each other. As a result, when the two support members 22 and 24 are joined together, the pole faces 26 and 28 of the core segments will be precisely aligned with each other. Moreover, since any variations in the thicknesses of the layers 42 of laminations and the layers 44 of bonding material therebetween are identical, all of the registering ends 46 of the laminations will be very precisely aligned with each other.

It has been found that under some circumstances, considerable variations can occur in the various members employed to make the lamination layers. For example, in the process of etching a lamination member from a sheet, some variations may occur in the physical dimensions of the lamination. In addition, considerable variations occur in the magnetic characteristics of the lamination members. Since the lamination members are very thin, an impurity or discontinuity in the member will have a major effect on the magnetic characteristics of the entire member. Moreover, the heat treating of a lamination member, the work hardening (by handling or mishandling), etc. effect the magnetic characteristics of the lamination member. In order to overcome these difficulties, the apparatus and method illustrated in FIGURES 9 and 10 may be employed.

In this method, a plurality of members 120 may be etched from a sheet of magnetic material similar to the members 48. Each of the members 120 include two separate portions 122 and 124.

Each of the portions 122 and 124 may be substantially identical to one of the preceding lamination members 48. More particularly, each portion 122 and 124 includes two separate sections 126 and 128 that are joined together at a junction 130. The two portions 122 and 124 may be secured together by means of interconnecting links 132 and 134. These links 132 and 134 may extend from the arms 136 and 138, as shown, or they may be extensions of the arms 136 and 138 substantially as shown by the dotted lines 140. It will be noted that the opposite ends of the portions 132 and 134 are joined together to thereby form a closed structure.

After a plurality of the lamination members 120 have been prepared, they may be mounted on a suitable fixture 142 such as shown in FIGURE 9. This fixture 142 includes a center plug 144 and a plurality of side members 146 and 148. The plug 144 has a length equal to the spacing between the reference surfaces 150 and 152 formed by the recesses in the lamination members 120. This plug 144 may be used as a Go-No-Go gauge for checking the dimensions between the two reference surfaces 150 and 152. It may be appreciated that by employing several plugs 144 having different dimensions, a large number of the lamination members 120 may be sorted according to the spacing between the reference surfaces. The members 146 may be positioned so that the edges of the members 120 will bear there-against. The members 148 may be adapted to move inwardly and outwardly toward and away from the members 120. As a result of the clearance spaces 154 between the plug 144 and the member 120, all of the lamination members 120 may be moved into precise registry with each other. It will be seen that this arrangement will be effective to permit the laminations to be rapidly sorted according to their size and assembled into groups with each of the laminations in the group being precisely aligned with each other.

After all of the members 120 have been accurately aligned and sorted, they may be bonded together by any suitable means such as a bonding process wherein a layer of bonding material will be provided between the successive laminations. The interconnecting links 132 and 134 at the ends of this assembly may be removed to provide a pair of core structures similar to the integral core structures 86.

However, it has been found that considerable variations may be present in the magnetic characteristics of these assemblies. Accordingly, prior to the separating of the portions 122 and 124 from each other, it may be desirable to check its magnetic characteristics by employing an apparatus similar to that of FIGURE 10. This apparatus includes a pair of fixtures 160 and 162 adapted to fit around at least a part of the assembly. One of the fixtures 160 includes a base and a movable cover 164. A plurality of conductors 166 and electrical contacts are provided in the base and cover. When the core assembly is in position in the fixture, the conductors 166 will form an electrically continuous winding which encircles a portion of the core structure. The opposite fixture 162 also includes a base and cover 168 and at least one conductor which is effective to form an electrically conductive loop around a portion of the core structure.

After the structure has been placed in the fixtures 160 and 162, a suitable signal may be circulated through one of the windings. This will produce a corresponding flux field in the core structure. Since the structure forms a closed magnetic loop, the flux will circulate through the entire structure and induce a corresponding signal in the other winding.

Since the structure forms an unbroken magnetic loop free from any discontinuities, air gaps, etc., the degree of coupling between the two coils will be closely related to the magnetic characteristics of the core structure. As a result, it will be possible to accurately determine the magnetic characteristics of the core structure.

After the structure has been checked for its magnetic characteristics, it may be divided into the two portions 122 and 124. These will be identical to the core structures 86 and may be fabricated into a head as described above.

While only a number of embodiments of the present invention are disclosed herein, it will be readily apparent to persons skilled in the art that numerous changes and modifications may be made thereto without departing from the spirit of the invention. Accordingly, the foregoing disclosure and description thereof are for illustrative purposes only and do not in any way limit the invention which is defined only by the claims which follow.

What is claimed is:

1. The method of forming a magnetic head having a magnetic circuit, said method including the steps of:
- providing a plurality of magnetic laminations having a center line and having two halves symmetrically disposed about the center line and having a reference surface symmetrically disposed about the center line between the two halves and having opposite ends defining the extremities of the reference surface,
- providing a channel in a non-magnetic member substantially normal to the center line,
- positioning a group of the magnetic laminations in the channel,
- dividing said group of laminations symmetrically relative to the center line at the opposite ends of the reference surface to form two separates halves of the head, and
- joining said halves together to define the magnetic circuit of the head.

2. The method of forming a magnetic tape recording-playback head having a magnetic circuit, said method including the steps of:
- providing a plurality of magnetic laminations each having a center line and having two halves symmetrically disposed about the center line and having a reference surface on opposite sides of the center line,
- forming a channel in a non-magnetic member with a configuration conforming substantially to the configuration of the magnetic laminations,
- positioning said laminations in the channel with the reference surfaces of the magnetic laminations aligned with each other,
- dividing said laminations at the opposite ends of the reference surfaces to form two separate halves, and
- joining said halves together with the ends of the laminations in the two halves aligned with each other to define an air gap.

3. The method of forming a magnetic head having a magnetic circuit, said method including the steps of:
- providing a plurality of magnetic laminations having a center line and having two halves symmetrically disposed about the center line and having a reference surface adjacent to the center line and symmetrically disposed about the center line,
- stacking said laminations with the reference surfaces aligned,
- bonding the aligned laminations together,
- providing at least one winding on said stack of laminations,
- dividing said group of laminations at the opposite ends of the reference surface to separate the magnetic laminations into the two halves, and
- joining said halves together.

4. A method of forming a magnetic tape recording-playback head having a magnetic circuit, said method including the steps of:
- providing a non-magnetic member having a center line and having two halves symmetrically disposed about the center line and having a reference surface on said member on opposite sides of the center line and in symmetrical relationship to the center line,
- forming a channel across said member substantially normal to the center line,
- forming a group of substantially identical magnetic laminations having two sections corresponding to portions of the magnetic circuit,
- providing between the two sections of each lamination a reference surface on each of said laminations corresponding to the reference surface on the non-magnetic member,
- providing a junction portion integrating each lamination between the sections, positioning said group of laminations in the channel with the reference surfaces on the laminations aligned with the reference surface on the member,
bonding the group of laminations together with the reference surfaces therein aligned with each other,
dividing said member and group of laminations at the opposite ends of the reference surfaces to form two separate halves, and
joining said halves together with the ends of the laminations in the two halves aligned with each other and separated by an air gap.

5. A method of making a magnetic head having a magnetic circuit, said method including the steps of:
forming a group of substantially identical magnetic laminations, each of which has two sections corresponding to two portions of the magnetic circuit and has an integrating portion in each lamination between the two sections and has at least one reference surface on each lamination at the integrating portion of each lamination with the reference surface of each lamination substantially identical with the reference surfaces of the other laminations,
stacking the group of laminations with the integrating portions aligned and the reference surfaces aligned,
bonding the group of laminations together to form a laminated structure wherein the integrating portions are aligned and the reference surfaces are aligned,
providing a winding on at least one of the sections,
dividing said laminations at the opposite ends of the integrating portions to form two separate segments with the integrating portions eliminated,
forming pole faces on the ends of the segments formerly adjacent the integrating portions,
positioning the pole faces adjacent each other to form an air gap therebetween, and
joining the two segments together to form the magnetic circuit.

6. A method of making a magnetic head having a magnetic circuit, said method including the steps of:
forming a group of substantially identical magnetic laminations, each of which has two sections corresponding to two portions of the magnetic circuit,
providing an integrating portion in each lamination between the sections,
providing at least one reference surface on each lamination at the integrating portion of each lamination with the reference surface of each lamination substantially identical with the reference surface of the other laminations,
stacking the group of laminations with the integrating portions aligned and the reference surfaces aligned,
bonding said laminations together to form a laminated structure wherein the integrating portions and reference surfaces are aligned with each other,
dividing said structure at the opposite ends of said integrating portions to form two separate segments, and
joining the two segments to form the magnetic circuit.

7. A method of making a magnetic head having a magnetic circuit, said method including the steps of:
forming a group of substantially identical magnetic laminations, each of which has two sections corresponding to two portions of the magnetic circuit,
providing an integrating portion in each lamination between the sections,
aligning the laminations in the group with the integrating portions aligned,
bonding the group of said aligned laminations together to form a laminated structure,
dividing said structure at the opposite ends of said integrating portions to form two separate segments, and
joining the two segments to form the magnetic circuit.

8. The method set forth in claim 7 wherein pole faces are formed on the ends of the segments adjacent the integrating portions removed from the segments and wherein the two segments are joined with the pole faces adjacent each other and separated by an air gap to form the magnetic circuit and wherein a winding is disposed on at least one of the segments.

9. A method of making a magnetic head having a magnetic circuit, said method including the steps of:
forming a group of substantially identical magnetic laminations having two sections corresponding to portions of the magnetic circuit and having a reference surface in each lamination between the two sections,
stacking said laminations in said group,
aligning said reference surfaces of the stacked laminations with one another,
bonding said aligned laminations in said group to form a laminated structure wherein the reference surfaces are aligned with each other,
providing at least one winding on at least one section of said structure,
dividing said structure into two separate segments at the opposite ends of the reference surface to eliminate the portions of the laminations defined by the reference surfaces, and
joining the two segments to form the magnetic circuit.

10. The method set forth in claim 9 wherein pole faces are formed on the ends of the segments at the positions adjacent the portions eliminated from the laminations upon the formation of the segments and wherein the segments are joined with the pole faces separated by an air gap.

11. A method of making a magnetic head having a magnetic circuit, said method including the steps of:
forming a group of magnetic laminations, each of which has two sections corresponding to portions of the magnetic circuit and each of which has an integrating portion in each lamination between the sections and each of which has a reference surface in each of said integrating portions,
stacking said laminations in said group,
aligning said reference surfaces of the stacked laminations,
bonding said stacked and aligned laminations together to form a laminated structure,
dividing said laminated structure at said opposite ends of said integrating portions to form two separate segments of the magnetic circuit, and
joining the two segments together at the ends of the segments to form said magnetic circuit.

12. The method set forth in claim 11 wherein a winding is disposed on at least one of the sections after the laminations have been bonded.

13. A method of making a magnetic head having a magnetic circuit, said method including the steps of:
forming a group of substantially identical magnetic laminations, each of which has two sections corresponding to portions of the magnetic circuit and each of which has an integrating portion in each lamination between the sections,
stacking the laminations in the group,
aligning the integrating portions of the laminations,
bonding said stacked and aligned laminations together to form a laminated structure,
dividing said structure at said opposite ends of said integrating portions to form two separate segments of the magnetic circuit, and
joining the ends of the two segments together to form said magnetic circuit.

14. A method of making a magnetic head having a magnetic circuit with an air gap therein, said method including the steps of:
forming a plurality of substantially identical magnetic laminations into a continuous magnetic member having two sections corresponding to two portions of the magnetic circuit and having an integrating portion between the segments, supporting the magnetic member at said integrating portion, winding at least one coil on at least one of said sections, dividing said member at the opposite ends of said integrating portion to separate said sections from each other, and joining said sections together at the ends of said sections not adjacent said integrating portion, and forming an air gap between the ends of said sections adjacent said integrating portion.

15. The method set forth in claim 14 wherein pole faces are formed on the ends of the sections adjacent the opposite ends of the integrating portions and wherein the sections are joined with the pole faces separated by an air gap.

16. A method of making a magnetic head having a magnetic circuit with an air gap therein, said method including the steps of:

forming a plurality of substantially identical magnetic laminations into a continuous magnetic member having two sections that correspond to two parts of the magnetic circuit and are joined by an integrating portion, dividing said member at the opposite ends of said integrating portion to separate said sections from each other, forming pole faces on the portions of said sections adjacent said opposite ends of said integrating portion, positioning the pole faces adjacent each other to form the air gap between the pole faces, and joining said sections together at the ends of said sections not adjacent said integrating portion, and forming an air gap between the ends of said sections adjacent said integrating portion.

17. A method of making a magnetic head having a magnetic circuit, said method including the steps of:

forming a plurality of substantially identical magnetic laminations into a continuous magnetic member having two sections that correspond to two parts of the magnetic circuit and are joined by an integrating portion, dividing said member at the opposite ends of said integrating portion to separate said sections from each other, and joining said sections together at the ends of said sections not adjacent said integrating portion, and forming an air gap between the ends of said sections adjacent said integrating portion.

18. The method set forth in claim 17 wherein pole faces are formed adjacent the opposite ends of the integrating portion after the removal of the integrating portion and wherein the two sections are formed with the pole faces in contiguous relationship to define an air gap between the pole faces.

References Cited

UNITED STATES PATENTS

| | | | |
|---|---|---|---|
| 2,795,757 | 6/1957 | Wylen | 324—34 |
| 3,246,384 | 4/1966 | Vice | 179—100.2 |
| 2,919,312 | 12/1959 | Rosenberger et al. | 29—155.5 |

BERNARD KONICK, *Primary Examiner.*

A. I. NEUSTADT, *Assistant Examiner.*

U.S. Cl. X.R.

179—100.2; 324—34; 340—174.1; 346—74